United States Patent [19]

Beyersdorf

[11] Patent Number: 5,008,559

[45] Date of Patent: Apr. 16, 1991

[54] METHOD FOR OPERATING AN OPTICAL SMOKE DETECTOR AND OPTICAL SMOKE DETECTOR FOR THE METHOD

[76] Inventor: Hartwig Beyersdorf, Travemunder Allee 6a, 2400 Lubek, Fed. Rep. of Germany

[21] Appl. No.: 403,282

[22] Filed: Sep. 6, 1989

[30] Foreign Application Priority Data

Sep. 17, 1988 [DE] Fed. Rep. of Germany ....... 3831654

[51] Int. Cl.[5] ............ G01N 15/06

[52] U.S. Cl. ............ 250/575; 356/439; 340/630

[58] Field of Search ............ 250/575, 574, 573; 356/438, 439; 340/630

[56] References Cited

U.S. PATENT DOCUMENTS

| | | | |
|---|---|---|---|
| 4,166,960 | 9/1979 | Meili | 250/575 |
| 4,242,673 | 12/1980 | Cooper | 356/439 |
| 4,647,785 | 3/1987 | Morita | 340/630 |
| 4,857,895 | 8/1989 | Kaprelian | 250/574 |

FOREIGN PATENT DOCUMENTS

| | | |
|---|---|---|
| 0079010 | 5/1983 | European Pat. Off. . |
| 2754139 | 7/1978 | Fed. Rep. of Germany . |
| 3334545 | 4/1985 | Fed. Rep. of Germany . |

*Primary Examiner*—David C. Nelms
*Attorney, Agent, or Firm*—Faegre & Benson

[57] ABSTRACT

A method for operating an optical smoke detector, wherein for smoke detecting purposes at least one light sensitive receiver within a detection chamber measures the useful scattered radiation which emanates from a volume unit within said chamber which is located in the intersecting area of the collimated field of view of said receiver and of the collimated beam of a light source within said chamber, said receiver sensing the scattered radiation caused by a contamination of said chamber or a second light sensitive receiver detecting the radiation reflected from a surface unit of said chamber, respectively, whereby measuring the reflexion radiation emanating from an illuminated surface unit within said chamber.

14 Claims, 5 Drawing Sheets

METHOD FOR OPERATING AN OPTICAL SMOKE DETECTOR AND OPTICAL SMOKE DETECTOR FOR THE METHOD

The present invention relates to a method for operating an optical smoke detector.

BACKGROUND OF THE INVENTION

Optical smoke detectors include at least a light source, for example a light-emitting diode operating in the infrared range, and a light-sensitive receiver, for example a photo element. The radiation of the light source and the field of vision of the light-sensitive receiver are collimated. The elements are disposed so that the light-sensitive receiver does not directly receive the radiation from the light source. Smoke detectors of this type rely on the principle that aerosols entering the detector chamber reflect the light radiation more or less. This results in a scattered radiation which is received by the receiver which is triggered and generates an alarm signal provided the scattered light radiation has a predetermined intensity.

The detector chamber of course needs at least an opening through which the smoke may enter the detector chamber. However, an opening in the chamber makes possible the entering of light. One tends to design the optical system in the chamber so that it is shielded against entering light as far as possible. Light entering from the environment is scattered by multiple reflection on the walls of the chamber. The light source disposed in the chamber provides scattered radiation, too. Accordingly, the environmental light and the light source result in a combined scattered radiation which changes in response to the contamination of the detector chamber walls. As there is an opening for the smoke, contamination can not be prevented. Increasing contamination leads to an increased proportion of the scattered radiation. Consequently, the scattered radiation reaches levels which exceed the threshold value of the receiver. Accordingly, there will result false alarm which is most objectionable in fire prevention systems.

The proportion of the radiation from the light source which impinges on the receiver when smoke is in the chamber, is at most 1%. This clearly shows how severely background or noise radiation increased by contamination affects the detecting system. An increase of the background radiation results in an increased sensitivity of the smoke detector. This means that small volumes of smoke which do not yet indicate a danger cause an alarm. Thus, a false alarm may be given at a time in which the noise radiation is not yet sufficient to reach the threshold value of the receiver.

PRIOR ART

It is known to operate the light source by pulses and to activate the receiver during the transmitting pulses only. By this operation, a number of environmental light phenomena may be suppressed. However, the noise radiation above discussed cannot be suppressed thereby. The prior art shows a number of devices to eliminate the effect of the noise radiation.

According to German 27 54 139, a smoke detector includes a pair of light-sensitive receivers. The first receiver is disposed normal with respect to the light source, whereas the second receiver is disposed parallel to the first receiver adjacent the light source, both receivers observing a surface element on the chamber wall. The output signals of both receivers are subtracted to compensate for the noise radiation. However, the known detector does not consider that the receiver senses the background radiation from the total space of the chamber. The volume generating the scattered useful radiation when smoke enters the chamber has a substantially larger diameter than the light beam of the light source. Thus, the second receiver alike receives useful radiation. A compensation of the noise radiation is not possible when smoke enters. Further, the reflection from the wall area is very low. It is practically impossible to detect the background radiation caused by contamination of the chamber.

German 27 54 139 shows a single light-sensitive receiver which is pivoted by suitable means to either cross the light beam of the light source or to detour the light beam. A smoke detector should not have mechanical drive means for pivoting the optical system. Further, the known device lacks a precise detecting of contamination.

According to European 0 079 010, a smoke detector includes a second light-sensitive element which directly receives light from the light source. The second receiver measures the intensity of the radiation and controls the smoke sensitivity when the light source itself is contaminated. However, a compensation of the background radiation which is caused by contamination of the detector chamber is not possible.

Still further, German 33 34 545 teaches a smoke detector wherein compensation of the noise radiation is not disclosed.

SUMMARY OF THE INVENTION

It is an object of the present invention to provide a method to operate an optical smoke detector which safely prevents a false alarm otherwise caused by the background scattered radiation from contamination of the detector chamber.

According to the invention, the contamination of the chamber, for example dust particles settling down on the chamber walls, is directly measured.

According to a first embodiment of the present invention, the detector chamber includes a second light-sensitive receiver which is directed towards a surface area of the chamber which is illuminated by the light source. According to a second embodiment, a pair of light sources is provided, one of which illuminates an area of the chamber which is in the field of vision of the receiver.

In this manner, the scattering of light on the area of the chamber wall is directly measured, it being understood that the intensity of the background light is very low when the wall is black at the beginning, and increases when dust enters the chamber over a period of time.

The invention provides for a relatively high signal level indicative of the contamination. The increasing signal level is indicative of the increasing noise radiation.

When this signal level reaches a predetermined value, a service signal may be generated indicating that the smoke detector should be cleaned. The service signal may be further used to change the sensitivity of the receiver provided for receiving the useful scattered radiation. According to the invention, the receiver is connected to a threshold stage. The control signal is fed to the control input of the stage to increase the threshold level when the output signal of the receiver for the background radiation reaches a predetermined value. Accordingly, the threshold for triggering an alarm signal is increased when a predetermined contamination is detected in the chamber. Thereby, the threshold sensitivity may be approximately maintained constant when smoke enters. Otherwise, the sensitivity would increase with increasing contamination so that increasingly less smoke is necessary to generate an alarm signal. A particular advantage of the present invention is seen in the fact that compensating the background radiation may be performed even when smoke is in the chamber. As long as the amount of smoke in the chamber is below the alarm threshold, the smoke causes less reflection radiation from the illuminated area to impinge on the receiver for the background radiation during the checking cycle. The background radiation is however approximately replaced by the reflection on smoke particles in the light beam. Therefore, the intensity of the background radiation impinging on the receiver at relatively low smoke volume is kept approximately constant when the contamination is constant.

According to the invention, a separate light source as well as a separate receiver may be provided to measure the reflection on the surface area of the detector chamber wall. The expenditure for this is of course higher than with an additional light source or receiver alone. Furthermore, the radiation for the additional receiver should not impinge on the receiver measuring the useful scattered light radiation, and this receiver should not receive any noise radiation from the chamber wall additionally illuminated. The last-discussed requirement is not substantial as the pulse control provides for selectively operating both measuring devices.

SHORT DESCRIPTION OF THE INVENTION

Further features and details of the present invention will be apparent from the following description of specific embodiments which are given by way of example only with reference to the accompanying drawings in which.

Figure 1:
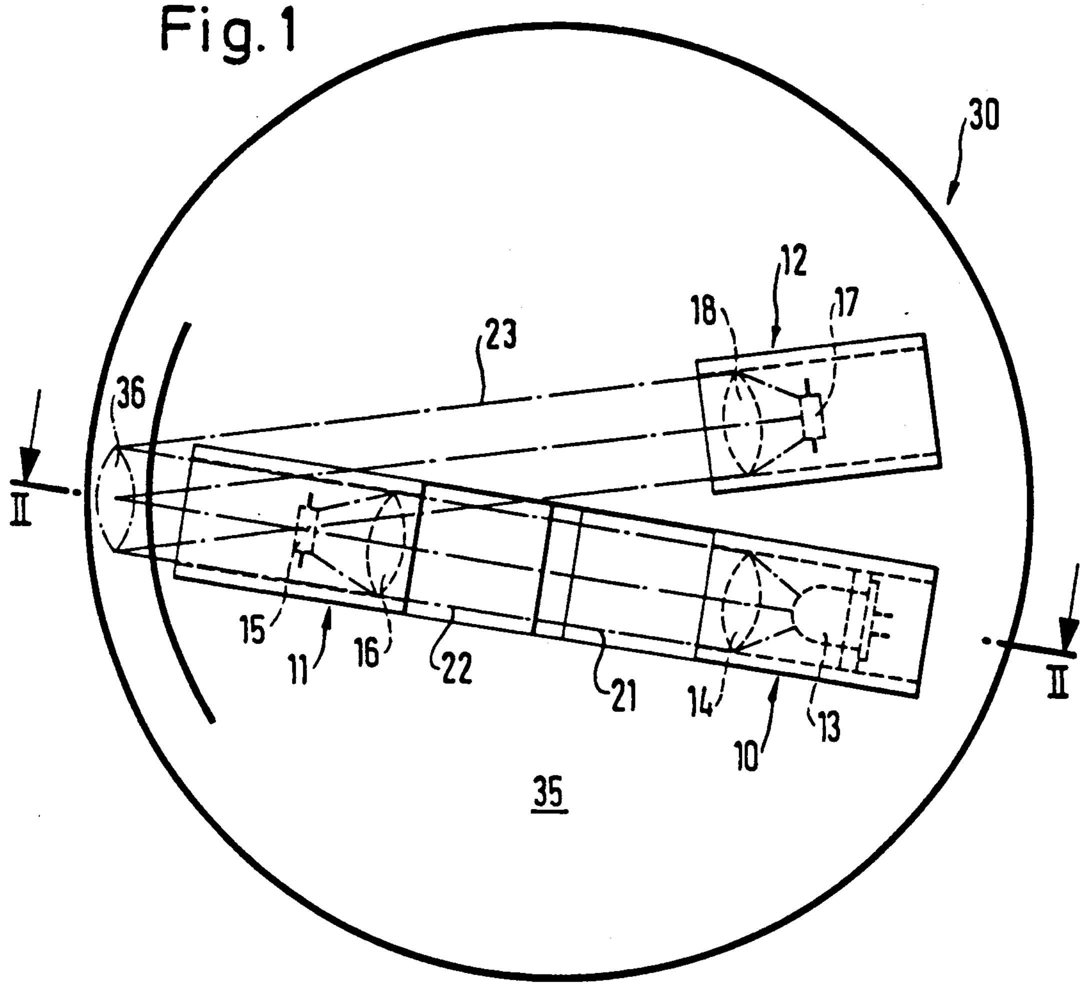
FIG. 1 is a front view of the optical system of a smoke detector in accordance with the present invention.

The optical system shown includes an optical transmitter 10, a first optical receiver 11 and a second optical receiver 12. The transmitter 10 includes a light-emitting diode 13 (LED) and a collector lens 14. The receiver 11 includes a photo element 15 and a collector lens 16. The second receiver 12 comprises a photo element 17 and a collector lens 18. The transmitter 10 and receivers 11, 12 are concealed in channels such as bores 19, 20 receiving the transmitter 10 and the receiver 11. The transmitter 10 provides a collimated radiation 21 by means of the lens 14. Due to lens 16 photo element 15 has a field of view 22. The receiver 12 has a field of vision 23. The optical system is received in a cylindrical casing 30 of which the upper lid is not shown in FIG. 2. The optical system further comprises an electrical circuitry and fastening means for securing the smoke detector on the ceiling of a room for example. Adjacent the lower front wall of the casing 30, circumferentially spaced slots 31 are provided, from which inwardly directed oblique sections 32 and 33 extend. The angled sections 32, 33 prevent excessive environmental light from entering the detector chamber 35 in the casing 30. All parts in the chamber, in particular its walls, are black to provide for maximum absorption.

Figure 2:
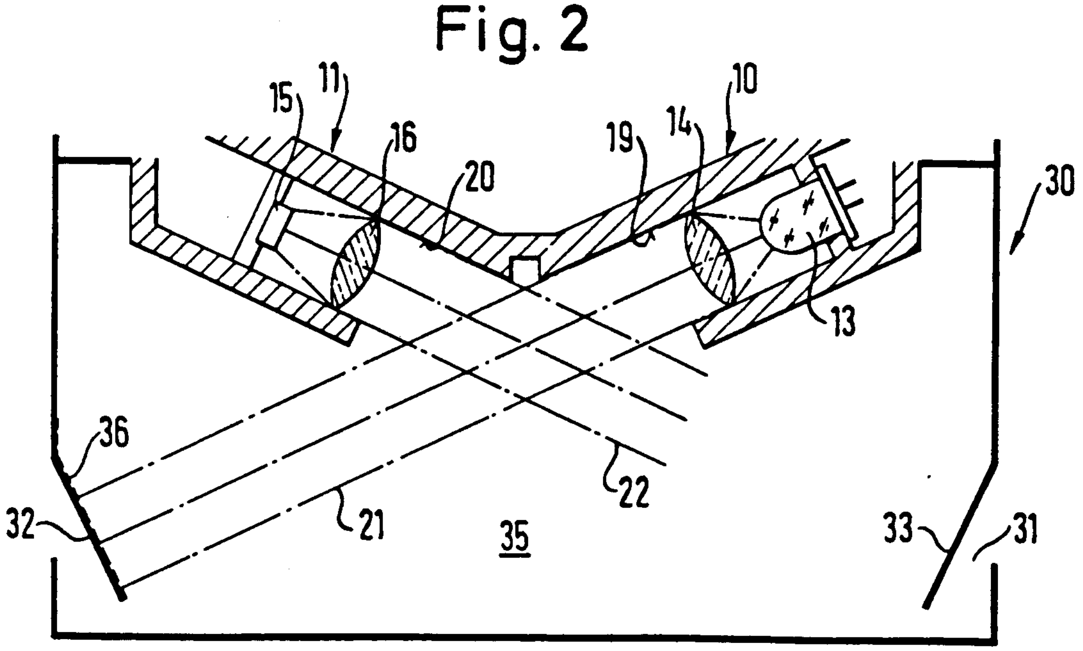
FIG. 2 is a cross-sectional elevation of the smoke detector according to FIG. 1 taken along line 2—2.

As shown in FIG. 2, the axes of the transmitter 10 and the receiver 11 are disposed so that the radiation 21 of the transmitter 10 intersects the field of vision 22 of the receiver 11, but does not directly impinge on the lens 16. The receiver 11 thus only receives ideally the scattered radiation which is caused by smoke penetrating the chamber 35 and defined by the smoke volume in which the radiation 21 and the field of vision 22 cross each other. An optical system of this type is prior art.

The radiation 21 of the transmitter 10 impinges on the inwardly extending portion 32 of the wall substantially under an angle of 90°. The area of radiation bears the reference numeral 36. The field of view 22 of the receiver 12 is aligned so that H senses the area 36 radiated from the transmitter 10, i.e. under an angle of 90° with respect to the portion 32. The transmitter 12 thus receives a portion of the light reflected from the radiation area. As the surfaces of the chamber 35 are black throughout, a reflection of nearly zero for a new smoke detector results. This condition changes, however, when dust particles accumulate inside the chamber 35. The more dust settles on area 36, the more light from transmitter 10 will be reflected. The receiver 12 detects the intensity of the radiation reflected and generates a corresponding output signal. It is thus representive of the contamination of the chamber caused by penetrating dust and accordingly of the general noise or background radiation in the chamber 35. It cannot be avoided that environmental light enters the chamber through the slots. Further, the radiation 21 of the transmitter 10 produces a noise radiation in the chamber 35. Both portions of this background radiation may rise to a level sufficient to activate the receiver 11 although there is no scattered radiation caused by penetrating smoke. Even if the background radiation does not reach the threshold value, it nevertheless results in a wrong identification of the scattered radiation.

Figure 3:
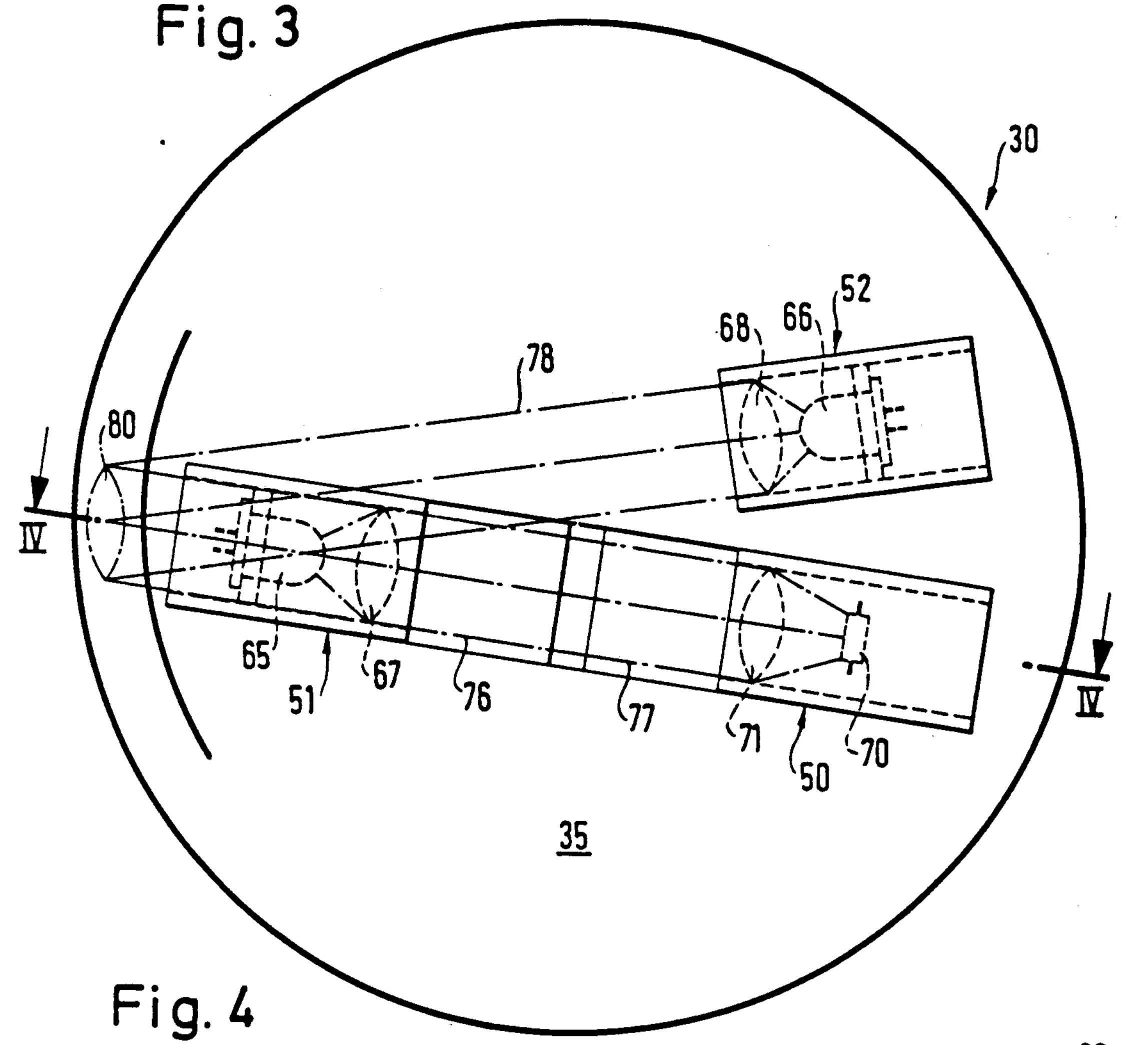
FIG. 3 is a front view of the optical system of a smoke detector according to a second embodiment of the present invention.
Figure 4:
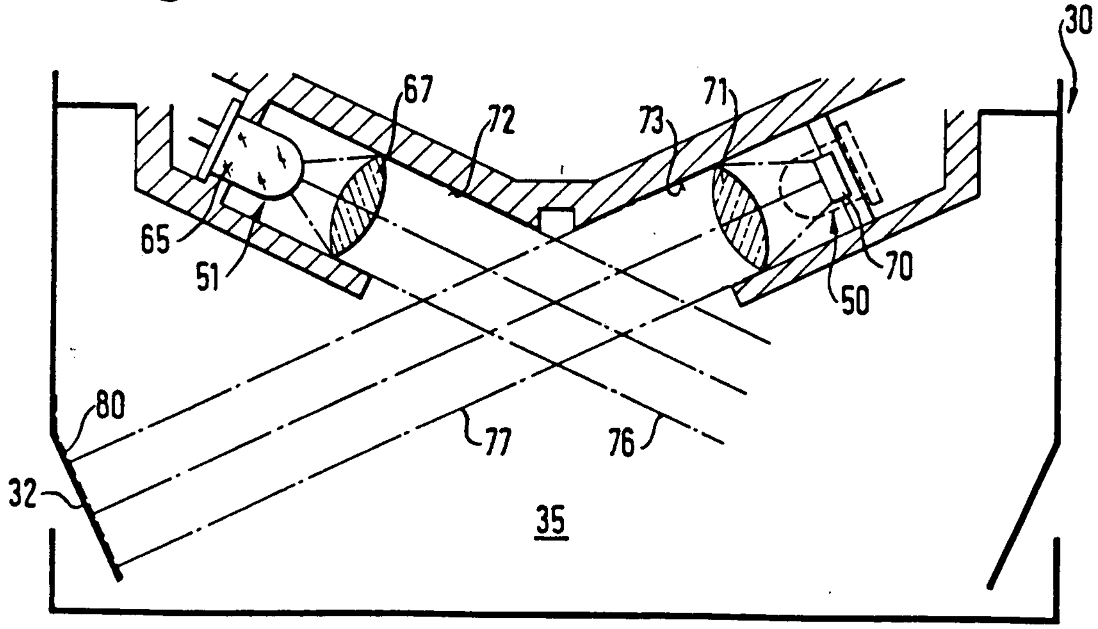
FIG. 4 is an elevation of the smoke detector according to FIG. 3 taken along the line 4—4.

The optical system according to the embodiment of FIGS. 3 and 4 comprises a pair of optical transmitters 51 and 52 and a receiver 50.The transmitters include a light-emitting diode 65 and 66, each, and respective collector lenses 67 and 68. The receiver 50 includes a photo element 70 and a collector lens 71. The transmitters 51, 52 and the receiver 50 are concealed in channels or bores in the casing 30 as indicated by the reference numerals 72 and 73 for the transmitter 51 and the receiver 50. The transmitter 51 provides for a collimated radiation 76 by means of the lens 67, and the photo element 70 has an aligned field of view 77 by means of the lens 71. Lens 68 causes an aligned radiation 78 to be radiated from the transmitter 52. As FIG. 4 particularly shows the axes of the optical transmitter 51 and the receiver 50 are disposed so that the radiation 76 intersects the field of view 77 of the receiver 50 and thus does not impinge on the lens 71. The receiver 50 thus receives ideally only the scattered radiation which is caused by smoke penetrating the chamber 35 within the volume in which the radiation 76 and the field of vision 77 cross each other. An optical system of this type for detecting smoke is known.

The radiation of the transmitter 52 impinges on the angled section 32 of the wall under approximately an angle of 90°. The field of radiation 80 is shown in the drawings. The field of view of the receiver 50 is directed so as to detect the area 80 radiated from the transmitter 52, alike under an angle of approximately 90° with respect to the section 32. Accordingly, a portion of the light reflected from the radiated area impinges on the receiver 50. Since the chamber 35 is black throughout, the reflection is nearly zero when the smoke detector is new. This, however, changes when dust particles accumulate in the chamber 35. The more dust penetrates the area 80, the more light radiated from transmitter 52 will be reflected. The receiver 50 detects the intensity of the reflected radiation and produces a corresponding output signal. This is thus representative of the contamination of the chamber caused by penetrating dust and thus of the scattered radiation in the chamber 35. It is pointed to the fact and will be explained below that the transmitters 51, 52 are operated alternatively, with the noise radiation caused by contamination of the chamber being detected only when the source 52 is in operation.

Figure 5:
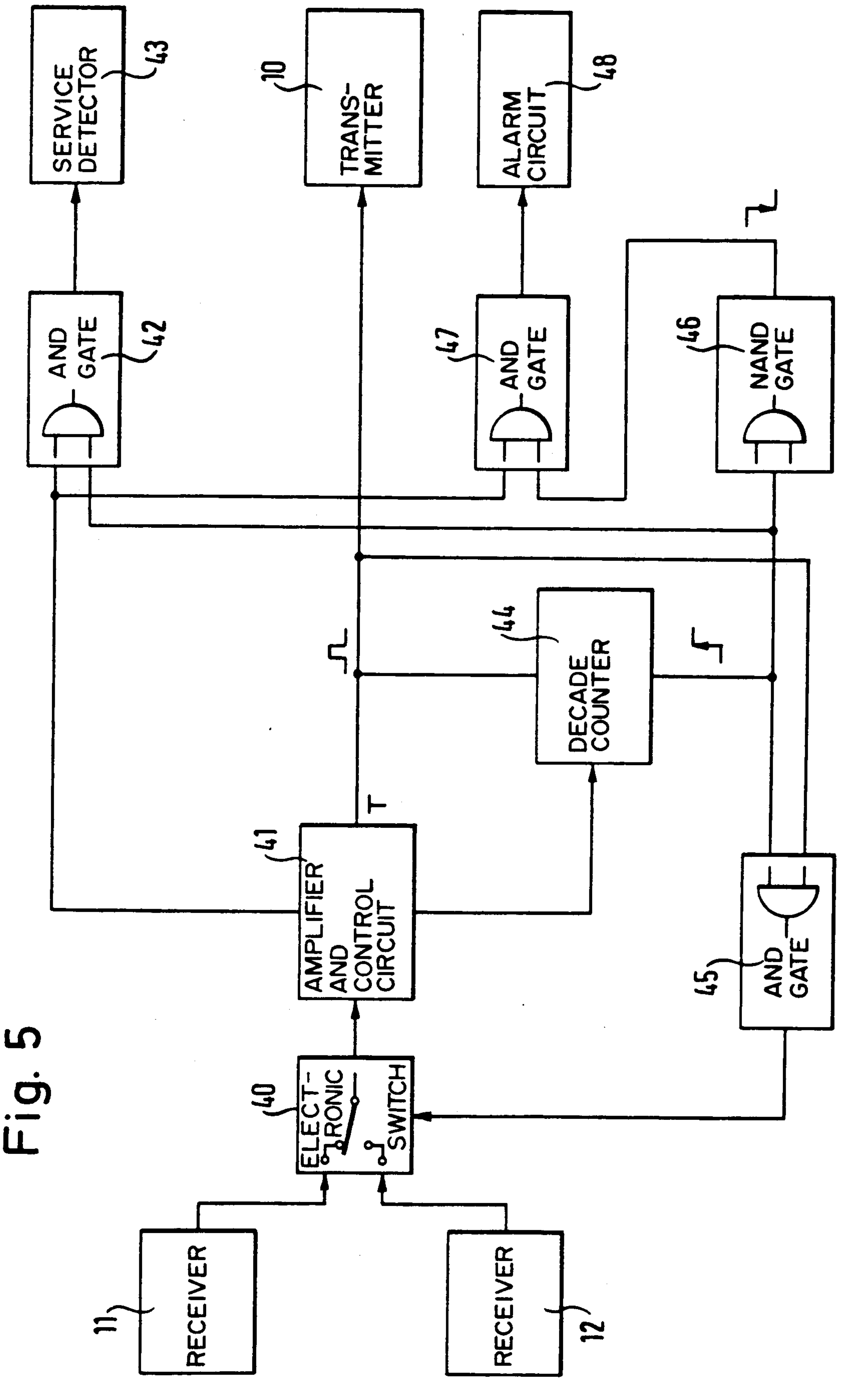
FIG. 5 is a block diagram of the detector circuitry.

FIG. 5 shows circuitry for operating the optical system of the smoke detector according to FIGS. 1 and 2. The receivers 11 and 12 are connected by electronic switch 40 to an amplifier and control circuit 41. The circuit 41 is connected by an AND gate 42 to a service detector 43. It is further connected to the transmitter 10 which radiates infrared light for example. The circuit 41 is still further connected to a decade counter 44 which is connected to the output of the control circuit 41. The output of the counter 44 is connected to the input of an AND gate 45 of which the second input is connected to the output of circuit 41. The output of the AND gate 45 is connected to the switch 40. The output of the counter 44 is connected to the input of a NAND gate 46 which output is connected to the input of a further AND gate 47. The second input of the AND gate 47 is connected to an output of the circuit 41. The output of the AND gate 47 is connected to an alarm circuit 48. The circuitry shown operates as follows.

The transmitter 10 is controlled by the amplifier and control circuit 41 to generate light pulses. At the same time of initiating the light transmitting pulse, the receiver 11 is activated, i.e. conditioned for receiving light. Under normal condition of the optical indicator, there will be no scattered light radiation in the light transmission path 21 of the transmitter 10 so that the receiver 11 is deactivated when the transmitting pulse has been terminated. Should the receiver generate, however, a significant output signal during a light transmitting pulse, the amplifier and control circuit 41 generates a pulse spontaneously stopping the decade counter 44. Any further transmitting pulses from the circuit 41 cannot change any more count of the counter. When a smoke signal is detected during the following n transmitting pulses, a second output of the circuit 41 is activated to generate the AND condition for the AND gate 47. The alarm circuit 48 is thus activated. The further AND condition for the AND gate 47 is generated by the output of the NAND gate 46 when the counter 44 does not provide a corresponding output signal.

After generation of a predetermined number of for example m transmitting pulses which are counted by the counter 44, the counter 44 provides an output signal which is fed through the AND gate 45 to the switch 40 when the further AND condition is present according to which a transmitting cycle was generated. The switch 40 then connects the second receiver 12 to the amplifier and transmitting circuit 41 to initiate a checking cycle. When the reflection on the chamber wall (FIGS. 1 and 2) does not exceed a predetermined level, the switch returns to its original position defining the smoke detecting cycle. It is further noted that smoke detection is suppressed during the checking cycle. For this purpose, the NAND gate 46 is provided, the output signal of which is changed when the counter generates an output signal. Therefore, an alarm signal cannot be fed through the AND gate 47 to the alarm circuit 48 even when there is an alarm condition. However, when the radiation reflected from the detector chamber and received by the receiver 12 exceeds a pre-determined level, the receiver 12 generates an output signal and the circuit 41 again spontaneously feeds a stop signal to the counter 44. The locking for the smoke detection is thus maintained, and the amplifier and control circuit is further connected to the receiver 12. Any further transmitting pulses from the amplifier and control circuit cannot change any more the count of the counter. Should the receiver receive sufficient scattered light during the next n transmitting pulses without interruption, during presence of the light-emitting pulse, a second output of the circuit 41 is activated and provides the AND condition for the AND gate 42. The output signal of the AND gate 42 controls the service circuit 43. For example, this indicates to the operator the amount of contamination in the detector chamber. Furthermore, an optical and/or acoustical indication may follow. It is contemplated to feed a corresponding output signal of the service circuit 43 to the amplifier and control circuit 41 to reduce the trigger sensitivity for detecting smoke depending on the contamination. As long as the extent of contamination allows for an error-free smoke detection, the circuit explained continues to operate in the known cycle. However, when the contamination reaches a critical value, further smoke detection may be suppressed to avoid a false alarm. The service kit 43 may be designed to detect and indicate different degrees of contamination.

Figure 6:
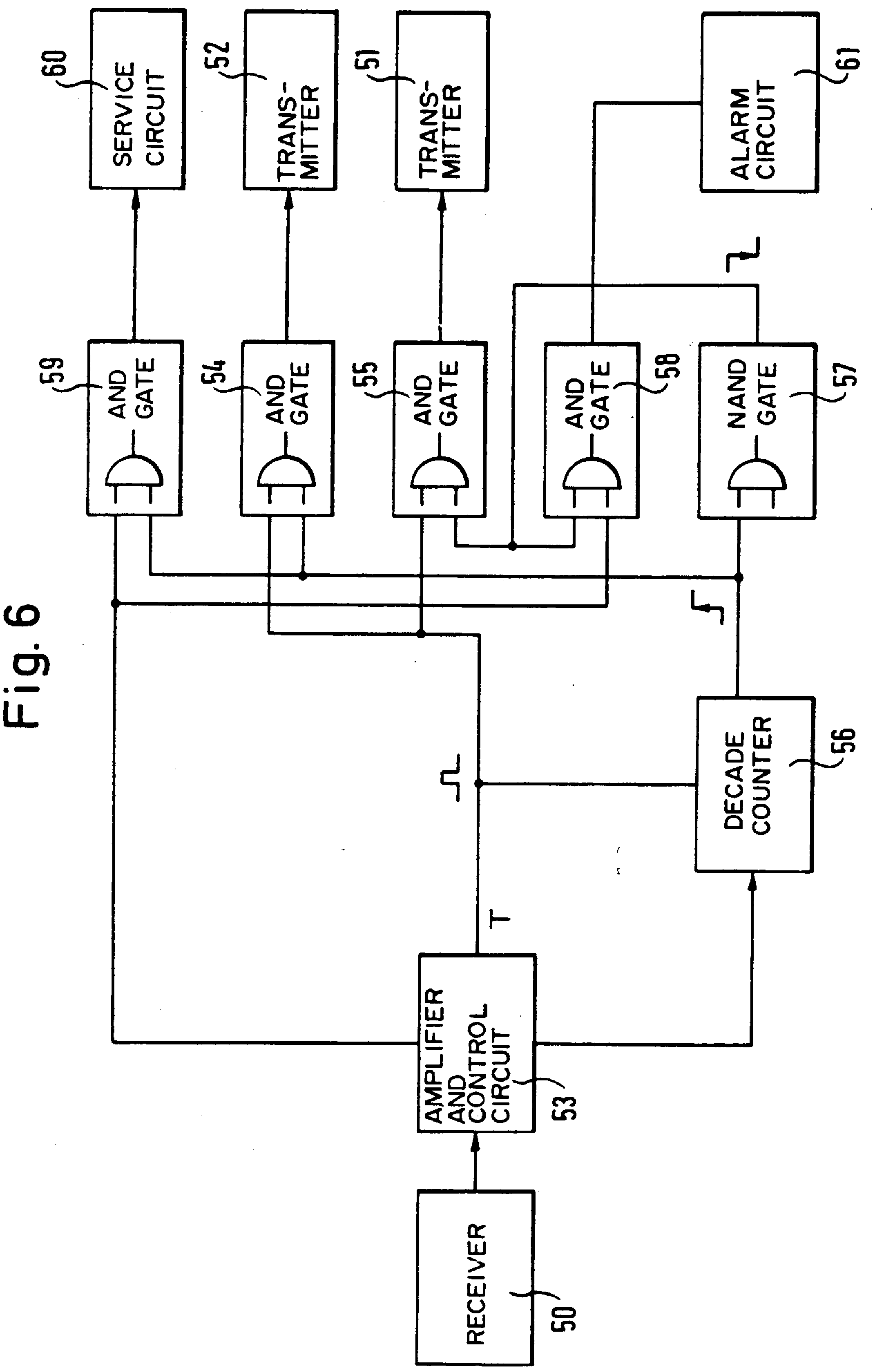
FIG. 6 is a block diagram of the detector circuitry according to a second embodiment and FIG. 7 is a graph showing signals and pulses occurring in the operation of the smoke detector according to the invention.

In the embodiment of FIG. 6, a single receiver 50 is provided which cooperates with a transmitter 51 for the smoke detection and a transmitter 52 for determining the contamination. The receiver 50 and the transmitter 51 cooperate in the same manner as the optical system to which FIG. 5 relates. The radiation of the transmitter 52 is directed to an area of the detector chamber which is within the point of view of the receiver 50. The transmitters 51, 52 receive clock pulses from the amplifier and control circuit 53 which is connected through an AND gate 54 to the input of the transmitter 52. An AND gate 55 is connected between the circuit 53 and the transmitter 51.

The clock pulses are fed to a decade counter 56, the output of which is connected to the second input of the AND gate 54. A NAND gate 57 is connected to the output of the counter 56, and the output of the NAND gate is connected to the second input of the AND gate 55 and to an input of the AND gate 58. An output of the circuit 53 is connected to an AND gate 59 which second input is connected to the output of the counter 56. A service circuit 60 is connected to the output of the AND gate 59. An alarm circuit 61 is connected to the output of the AND gate 58.

During the smoke detection cycle, the optical transmitter 51 is controlled by pulses, with the output of the NAND gate 57 generating the second AND condition for the AND gate 55. During the smoke detection cycle, the transmitter 52 is inactive since the counter 56 generates no corresponding output signal. When the output signal of the receiver 50 exceeds a predetermined level, the counter 56 is immediately stopped by the amplifier and control circuit as explained above in relation to FIG. 5 in order to obtain the electronic locking necessary and to trigger through the AND gate 58, the alarm circuit 61 after a predetermined number of measuring pulses by controlling the AND gate from the amplifier and control circuit 53. The second AND condition is generated through the output of the NAND gate 57. When the predetermined number of transmitting pulses is obtained in the counter, it generates a predetermined output signal whereby the AND gates 55 and 58 are locked through the NAND gate 57. The transmitter 52 now emits a light pulse while the receiver 50 is active in synchronism. When the output signal of the receiver 50 exceeds a predetermined level, this results in an electronic locking to control the service circuit 60 through the AND gate 59 when a predetermined level is maintained during a number of n measuring pulses. The second condition for the AND gate 59 is provided by the output signal of the counter 56. The signal received by the service circuit 60 may be used in the same manner as specified in relation with FIG. 5. The checking cycle just explained continues for a predetermined number of transmitting pulses after which the counter 56 is reset. As described above, the cycles of smoke detection and checking will be then alternately initiated.

Figure 7:
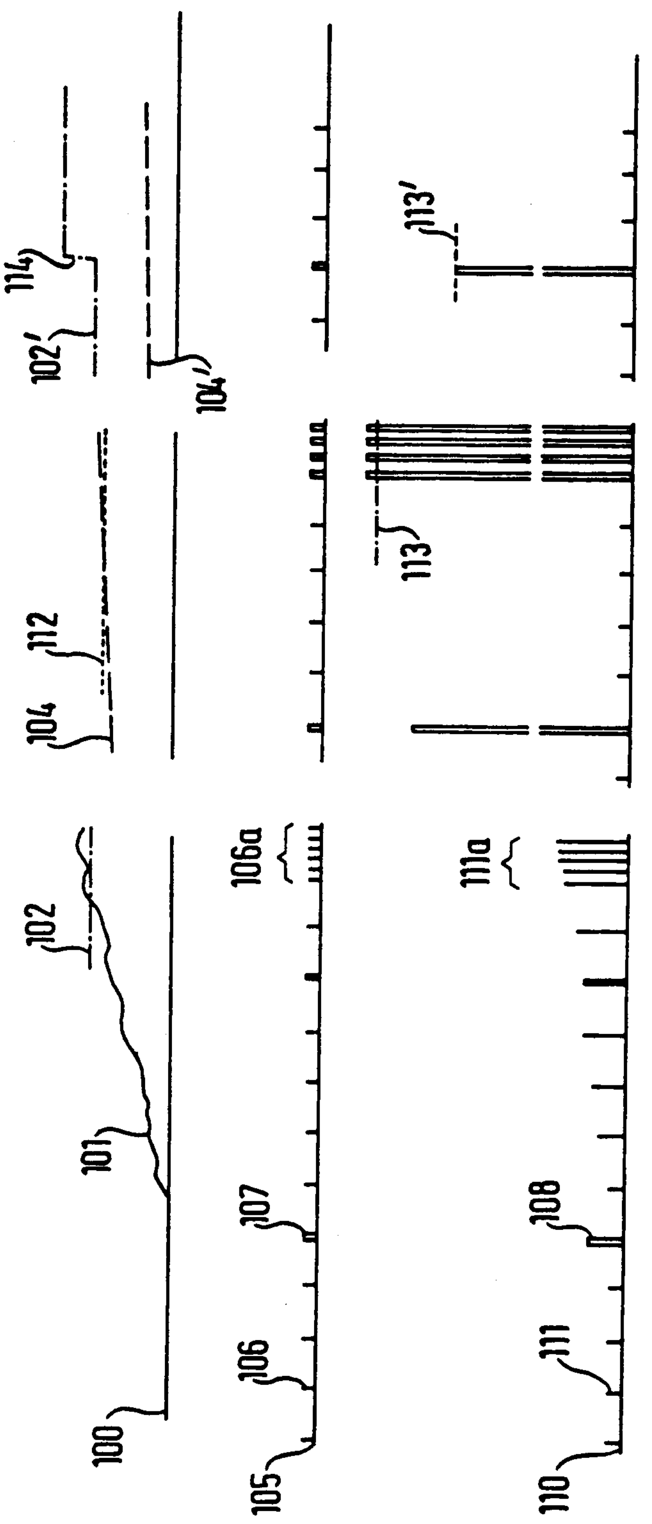

FIG. 7 shows a time-indicating axis 100 to represent analogous parameters indicative of the condition prevailing in the detector chamber 35 according to FIGS. 1 and 2, i.e. of the smoke 101 shown with increasing tendency, of the scattered radiation 104 due to contamination, and of an increasing scattered radiation 104, and the corrected threshold signal 102, The time axis 105 shows a number of light pulses 106 which are transmitted from the transmitter 10 in FIG. 5. FIG. 7 further shows checking light pulses 107 which are somewhat broader than the light pulses 106 serving for smoke detection. The checking light pulses 107 are radiated from the transmitter 10 in FIG. 5 after generation of four pulses 106 according to the graph in FIG. 7. The output pulses 111 of the receiver 11 for example are indicated on the time axis 110 as well as the output pulses 108 of the receiver 12. These output pulses are the reaction to the light pulses 106 or 107, respectively. It may be seen that, when the detector chamber is not yet contaminated, the output signal of the receiver 12 which output signal corresponds to the reflection of the light pulse on a surface of the detector chamber is relatively low, but already has a higher level than the output signal of the receiver 11. With increasing smoke in the detector chamber, the output pulses 111 of the receiver 11 increase. When the threshold 102 is reached, the transmitter 10 is controlled by the circuitry 41 and provides a light pulse sequence of higher frequency. This is shown at 106*a*. Correspondingly, a pulse train 111*a* is generated at the output of the receiver 11. By generating a faster train of measuring pulses over a predetermined time, it will be certified that smoke indeed has penetrated the detector chamber.

With increasing contamination (curve 104), the receiver 12 receives very strong output pulses as shown in the graph. Should the contamination exceed a threshold as indicated at 112 in an analogous system and at 113 for a discrete representation of the output pulses, a service signal may be generated by the stage 43 in FIG. 5. Alternatively, the threshold value 102 may be readjusted in the amplifier and control circuit. This is indicated by the dot and dash line over the time axis 100 at the step 114. Now, a higher output signal is necessary for the receiver 11 to generate an alarm signal by the circuit 41. As noted before, the threshold value may be adjusted in the circuit 41. However, it is possible to reduce the radiation intensity of the transmitter 10. This again reduces the operative sensitivity. From this follows that the threshold for the pulses 108 representing the contamination must be reduced as shown at 113'.

I claim:

1. An optical smoke detector, comprising a highly light-absorbing detector chamber (36), a light source (10) generating a light beam and a first and second light-sensitive receiver (11, 12) each co-operating with said detector chamber and having a limited field of view, wherein the field of view of said first light-sensitive receiver (11) intersects the radiation path of the light source (10) and the field of view of said second light-sensitive receiver (12) is exclusively directed onto a surface area of the detector chamber radiated by said light source, the detector further comprising an alarm circuit (48) generating an alarm signal when the output signal of the first light-sensitive receiver (11) reaches a predetermined value and a control circuit (41) connected to at least said second receiver generates a control signal when the output signal of said second light-sensitive receiver (12) reaches a predetermined value, and processing means processing the output signals of the first and the second receivers to provide an input signal for said alarm circuit and said control circuit, respectively, the processing means having two different modes, with one mode only the output signal of said first receiver and with the other mode only the output signal of said second receiver being processed.

2. The optical smoke detector of claim 1, wherein the light-sensitive receiver (12) receiving the scattered light radiation is connected to a threshold stage to adjust the threshold value, wherein the control signal is transmitted to the control input of said threshold stage to increase the threshold level when the output signal of the second light-sensitive receiver (12) receiving a background noise radiation reaches a predetermined level.

3. The optical smoke detector of claim 1, wherein said first and second light-sensitive receivers (11, 12) are connected by a switch (40) to the control circuit (41).

4. The optical smoke detector of claim 3 wherein the control circuit (41)is arranged to disable the alarm circuit (48) when the second light-sensitive receiver (12) is connected through the switch (40) to a service circuit (43).

5. The optical smoke detector of claim 1 wherein the control circuit (41) includes a clock generator and wherein a counter (44) connected to said clock generator activates: (i) said light-sensitive receiver (12) when a predetermined first count is reached, and (ii) the first light-sensitive receiver (11) when a second count is reached.

6. The optical smoke detector of claim 4 wherein said switch (40)is controlled by an output signal of a counter (44).

7. The optical smoke detector of claim 1 wherein said control signal is supplied to a service circuit (43) having a service signal which is fed to a threshold stage, the output signal of which disables the alarm circuit (48) when the service signal reaches a predetermined value.

8. The optical smoke detector of claim 1 wherein the surface area of the detector chamber (35) which is disposed in the field of view of said second light-sensitive receiver is provided approximately under an angle of 90° with respect to the optical axis of said light source.

9. An optical smoke detector comprising a highly light-absorbing detector chamber (35), a first light source (51) and at least alight-sensitive receiver (50) cooperating with the detector chamber, the field of view of said light-sensitive receiver (50)intersecting the radiation of said first light source(51), an alarm circuit (61) generating an alarm signal when the output signal of the light-sensitive receiver (50) reaches a predetermined value, and optical means for detecting a variation of the output signal of said light-sensitive receiver due to a contamination of the detector chamber(35), said optical means comprising a second light source (52) arranged to radiate a surface area (80) of said detector chamber (35) which area is disposed in the field of view of the light-sensitive receiver (50), wherein a control circuit (53) is provided to activate alternatively one of said first and second light sources(51, 52), and that said control circuit (53)generates a control signal when the output signal of the light-sensitive receiver (50) reaches a predetermined level during an active cycle of said second light source (52), wherein the control circuit (53) is arranged to disable an alarm circuit (48) when the second light source (52) is activated.

10. The optical smoke detector of claim 9, wherein the control circuit (53) is arranged to disable an alarm circuit (61) when the second light source (52) is activated.

11. The optical smoke detector of claim 9, wherein a control circuit (53) includes a clock and wherein an adjustable counter (56)connected to said clock activates: (i) said second light source (52) when a predetermined first count is reached and (ii) said first light source (51) when a second count is reached.

12. The optical smoke detector of claim 10 wherein a switch (40) is controlled by an output signal of a counter (44).

13. The optical smoke detector of claim 9 wherein the surface area of the detector chamber (35) which is disposed in the field of view of said light-sensitive receiver is provided approximately under an angle of 90° with respect to the optical axis of said second light source.

14. A method of operating an optical smoke detector for smoke-detecting purposes comprising:

(a) measuring with at least one light-sensitive receiver located within a detection chamber the scattered radiation which emanates from a volume within said chamber radiated by a light source, said volume defined by the intersecting areas of a collimated field of view of said receiver and of a collimated beam of a light source within said chamber, (b) detecting with a second light-sensitive receiver with a collimated field of view, the radiation reflected from a surface of said chamber illuminated by said first light source or by a second light source, respectively, by measuring the reflection radiation emanating from the illuminated surface within said chamber, and (c) detecting the radiations alternatively.

* * * * *